Figure 1:
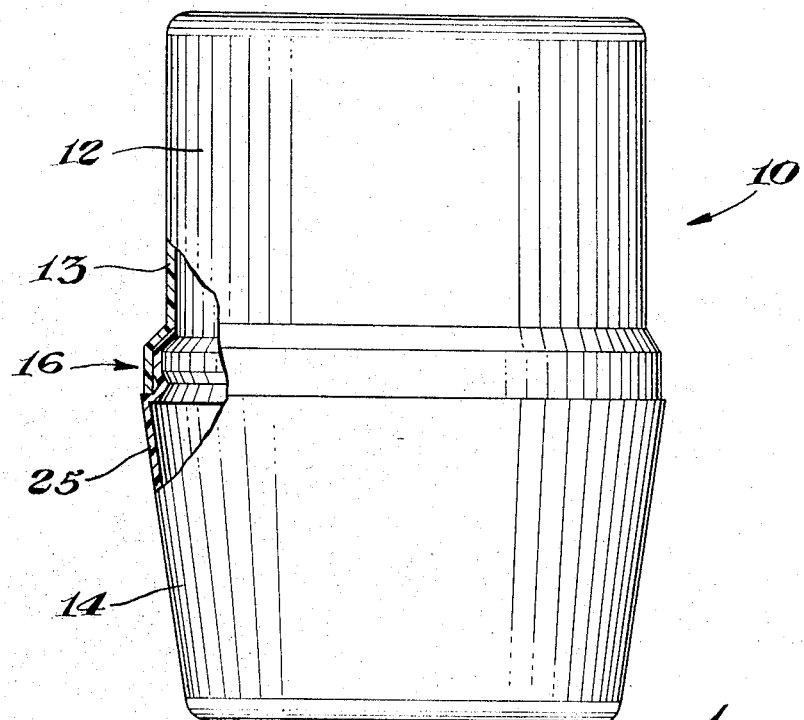

United States Patent Office 3,341,048
Patented Sept. 12, 1967

3,341,048
JOINT FOR THERMOPLASTIC ARTICLES
Anthony J. Carbone, 3834 Todd, Midland, Mich. 48640
Filed Oct. 16, 1964, Ser. No. 404,461
3 Claims. (Cl. 220—4)

This invention relates generally to the joining of thermoplastic articles and, more particularly, to an improved joint construction for spin welding of two thermoplastic components to form a unitary article.

It has been customary in forming containers and the like, of the nature hereinafter described, to make them from two components, one of the components being fabricated with a receiving portion while the other component is fabricated with an inserted portion for engagement with the first mentioned component. Because of the nature of thermoplastic material from which the containers are made, it is sometimes advantageous to join these components by the use of frictional heat generated by the process known as "spin-welding."

However, the simple lap seam used in the prior art for containers joined by the spin-welding process has not produced a fully satisfactory container. A constant source of difficulty with the spin-welding process is the occurrence of flash. Such flash is usually formed by small quantities of molten plastic which migrate from the seal area and solidify on the exterior surface of the object thereby affecting appearance and function. Prior to the present invention, flash has either had to be disregarded or eliminated by a second operation by the use of a planer or the like.

Accordingly, it is an object of the present invention to eliminate the problems presently created by flash resulting from spin welding thermoplastic components together.

A further object is to provide a novel joint structure for making components of a thermoplastic article, which structure provides essentially for hiding of flash by preventing its migration during the spin welding process.

A still further object of the present invention is to eliminate flash problems in spin welding by holding the flash internally of the seam area, thus eliminating the need for subsequent deflashing procedures.

Briefly, the present invention comprises forming the mating portions of two components to be spin welded of a configuration such that a channel-like chamber is created in the seam area to serve as a reservoir for molten plastic which would otherwise result in externally migrated flash. By containing the flash, not only are the aesthetics of the articles improved, but the flash is contained so as to prevent its later falling off and contaminating areas where it is not desired. This is all achieved without an additional trimming step being necessary.

Figure 2:
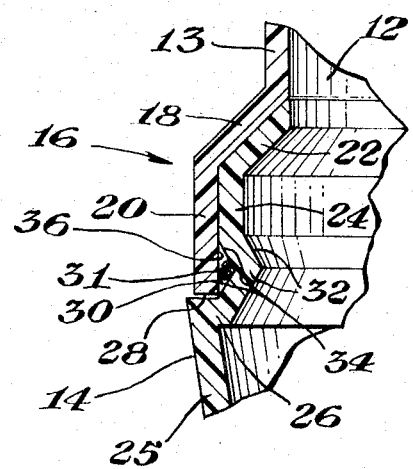

Yet additional objects and advantages of the present invention, and its numerous cognate benefits and features, are even more apparent and manifest in and by the ensuing description and specification taken in conjunction with the accompanying drawings in which, wheresoever possible, like characters of reference designate corresponding materials and parts throughout the views thereof, in which:

FIGURE 1 is a cross-sectional view of a container including a preferred embodiment of a joint structure constructed according to the principles of the present invention; and FIGURE 2 is an enlarged fragmentary cross-sectional view of the joint shown in FIGURE 1.

An article in the form of container 10 is illustrated in FIGURE 1. It can be formed of thermoplastic materials such as polystyrene, polyvinyl chloride, polyethylene, etc., which materials are well known to be spin weldable.

Container 10 includes an upper component 12 and a lower component 14. These components are joined together, by a spin welding process, to form a seam lap joint 16 at the juncture of the two components. The aforementioned spin welding process basically comprises spinning, in a rotational manner, one component within the other with their matig portions engaged. The heat of friction generated causes the thermoplastic material to soften and become tacky, thereby providing an adhesive action which causes the components to seal together upon cooling.

In the preferred embodiment shown, component 12 acts as the receiving component and component 14 acts as the inserting component in forming the article 10. That is, component 12 includes a side wall 13 having at its lower extremity an inclined flange 18 and a vertical flange 20. An inclined flange 22 and vertical flange 24 extend upwardly from the side wall 25 of component 14. The peripheral extent of flanges 22 and 24 are such as to fit snugly within the interior periphery of mating flanges 18 and 20. By being intimately mated, the spinning of component 12 with respect to component 14 will generate the necessary heat of friction to form a spin welded seam.

Also comprising a part of lap joint 16 of the present invention is a horizontal flange 26 on component 14 which provides a seating portion for the end of component 12. Extending between horizontal flange 26 and vertical flange 24 of component 14 is a first inwardly and then outwardly inclined portion 32 which, together with vertical flange 20 of component 12, forms channel 30, which is peculiar to the present invention. Portion 32 can be of any convenient configuration, that is, V-shaped, ribbed, semi-circular and the like, just so long as its outer periphery, defined in the preferred embodiment by surface 34, is substantially spaced inwardly from the inner surface 36 of flange 20 to form the necessary channel. Channel 30 is triangularly shaped in the particular embodiment shown. Since, for all practical purposes, a closed chamber is formed by the end 28 and shoulder 26 (there being only a slight gap, if any, therebetween) and by the mating flanges 20 and 24, the flash is trapped internally of the closed chamber area of channel 30. Migration of the flash 31 externally of joint 16 is thus prevented during the spin welding process. By so holding the flash internally of the seam area, it is not visible and cannot fall off and become a burdensome nuisance in handling or shipping.

The applications of this invention are numerous. For example, this invention can be used in such spin welded items as plastic vacuum formed holloware (cleanser cans, orange juice cans, many containers used for dry food products) as well as in closures for blown containers and the like. While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. An article comprising at least two mating components formed of thermoplastic material, each of said components having a circular cross-section, a peripheral end of one of said components having a flange defining an external diameter no greater than the internal diameter defined by a peripheral end of the other of said components, said flange having an inwardly directed portion spaced a substantial distance from the inner peripheral surface of said other component, the remainder of said flange spin welded with the peripheral end of said other component, excess flash being contained in the channel formed by said spaced portion.

2. The article of claim 1 wherein inner surfaces of said channel define a triangle.

3. An article comprising at least two mating components formed of like thermoplastic materials, each of said components having side walls presenting open ends defining a circle, the open end of one component having an outwardly offset portion defined by a vertical flange joined with an inclined flange connected with the rest of said side wall, the open end of said other component having an inwardly offset portion defined by an inclined flange joined with a vertical flange, a V-shaped portion extending first inwardly and then outwardly and joined with the last mentioned vertical flange and forming a channel, a horizontal flange joined at one extremity with said channel forming portion and at the other extremity with the rest of said side wall, said inclined flanges, vertical flanges, the bottom of said first mentioned vertical flange and the top of said horizontal flange all being spin welded together, whereby flash from said spin welding is contained within said channel.

References Cited

UNITED STATES PATENTS 3,064,608  11/1962  Karmazin  220—81
3,215,300  11/1965  Lynch  220—4

THERON E. CONDON, *Primary Examiner.*

GEORGE E. LOWRANCE, *Examiner.*

LOUIS G. MANCENE, *Assistant Examiner.*